(12) United States Patent  (10) Patent No.: US 9,692,921 B2
Nakamura  (45) Date of Patent: Jun. 27, 2017

(54) IMAGE READING DEVICE

(71) Applicant: Brother Kogyo Kabushiki Kaisha, Nagoya-shi, Aichi-ken (JP)

(72) Inventor: Kazutoshi Nakamura, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/009,911

(22) Filed: Jan. 29, 2016

(65) Prior Publication Data

US 2016/0227059 A1  Aug. 4, 2016

(30) Foreign Application Priority Data

Jan. 30, 2015 (JP) ................................. 2015-016632

(51) Int. Cl.
*H04N 1/00* (2006.01)
*H04N 1/04* (2006.01)
*H04N 1/10* (2006.01)

(52) U.S. Cl.
CPC ..... *H04N 1/00559* (2013.01); *H04N 1/00907* (2013.01); *H04N 1/04* (2013.01); *H04N 1/1061* (2013.01)

(58) Field of Classification Search
CPC .. H04N 1/00559; H04N 1/00907; H04N 1/04; H04N 1/1061
See application file for complete search history.

(56) References Cited

U.S. PATENT DOCUMENTS

2003/0103781 A1*  6/2003  Takahashi .......... H04N 1/00907
                                                          399/211
2012/0026558 A1    2/2012  Fujiwara

FOREIGN PATENT DOCUMENTS

JP    2005049613 A    2/2005
JP        3918690 B2  5/2007
JP    2012-034106 A    2/2012

* cited by examiner

*Primary Examiner* — Justin Seo
(74) *Attorney, Agent, or Firm* — Banner & Witcoff, Ltd.

(57) ABSTRACT

An image reading device includes a housing, a first support member, a reading unit, a movable member, and a flat cable. The housing defines an accommodating space between a bottom surface and a frame member facing the bottom surface. The first support member is supported by the housing and covers the accommodating space. The movable member holds the reading unit disposed in the accommodating space. The flat cable is connected to the reading unit at one end and an electrical part outside the accommodating space at the other end. The housing further includes a support wall protruding from the bottom surface toward the first support member and a cable receiving portion receiving a middle portion of the flat cable. The cable receiving portion is formed at a higher height level than a particular area of the bottom surface located between the support wall and the cable receiving portion.

11 Claims, 12 Drawing Sheets

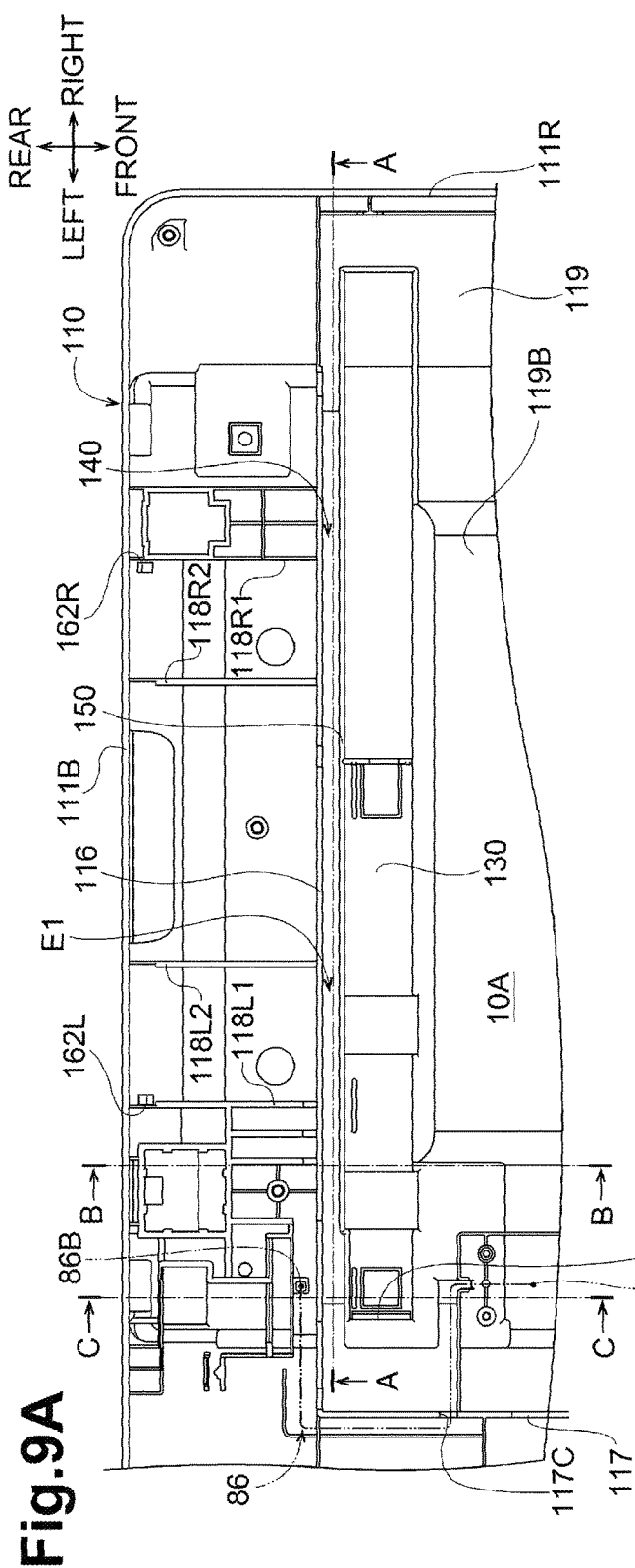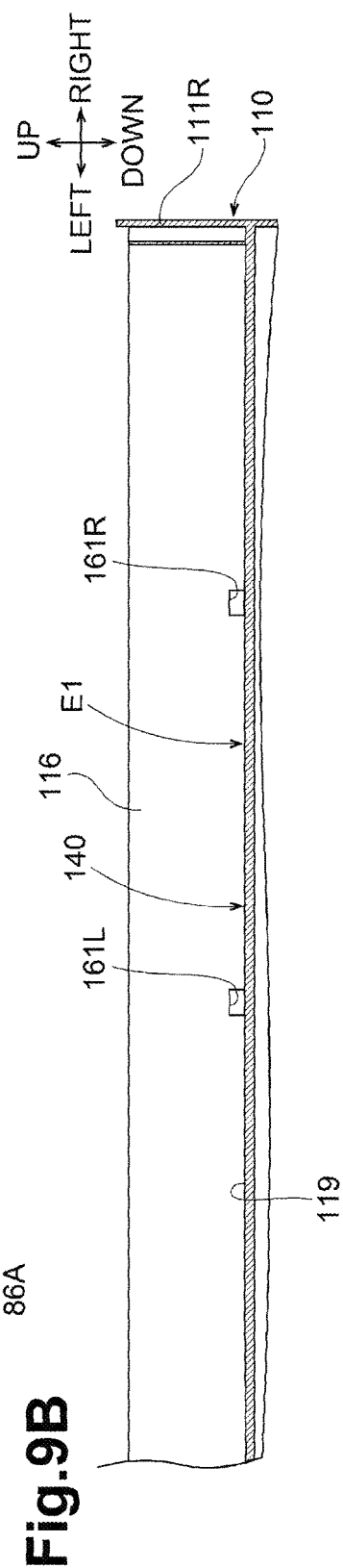

IMAGE READING DEVICE

CROSS-REFERENCE TO RELATED APPLICATION

This application claims priority from Japanese Patent Application No. 2015-016632, filed on Jan. 30, 2015, which is incorporated herein by reference in its entirety.

TECHNICAL FIELD

Aspects described herein relate to an image reading device.

BACKGROUND

An existing image reading device includes a housing, a contact glass, a reading unit, a movable member, and a flat cable.

The housing includes a bottom surface and a frame member that faces the bottom surface with a predetermined spacing therebetween. The housing defines an accommodating space between the bottom surface and the frame member. The contact glass is supported by the housing so as to cover the accommodating space with the outer periphery of the contact glass surrounded by the frame member. The contact glass is configured to support a document on an upper surface thereof. The reading unit is disposed in the accommodating space. The reading unit extends in the main scanning direction that is parallel to the contact glass. The movable member holds the reading unit. The movable member is reciprocally movable in the sub-scanning direction that is perpendicular to the main scanning direction. One end of the flat cable is connected to the reading unit, the middle portion of the flat cable is disposed on the bottom surface, and the other end of the flat cable is connected to the electrical part (more specifically, a control unit) disposed outside the accommodating space.

The housing further includes a cable receiving portion and a support wall. The cable receiving portion is formed in the bottom surface. The middle portion of the flat cable is disposed in the cable receiving portion. The support wall protrudes from the bottom surface toward the contact glass and extends along the cable receiving portion in the sub-scanning direction. The support wall supports a location proximate to the outer periphery of the contact glass from underneath.

An area of the bottom surface located between the support wall and the cable receiving portion is flush with the cable receiving portion. That is, the cable receiving portion is at the same height level as the area.

In the image reading device, the movable member that holds the reading unit moves in the sub-scanning direction and, at the same time, reads the image on the document supported by the contact glass. At that time, the flat cable becomes deformed in the accommodating space and follows the movement of the movable member in the sub-scanning direction.

SUMMARY

If a liquid comes in contact with the image reading device, the liquid drops from the top of the image reading device onto the frame member and the contact glass. Thereafter, the liquid may flow in gaps formed in the frame member and the contact glass and may further flow through a gap between the outer periphery of the contact glass and the support wall and enter the accommodating space. When the cable receiving portion is formed so as to be at the same height level as the area located between the support wall and the cable receiving portion, that is, when an area extending from the lower end of the support wall to the cable receiving portion forms a flat surface, if the entering liquid falls down along the support wall, the liquid may flow on the flat surface and reach the middle portion of the flat cable disposed in the cable receiving portion. Thus, the liquid may further flow on the flat cable and reach an electrical part. As a result, the entering liquid may cause the electrical part of the image reading device to malfunction.

Accordingly, it is an object of the disclosure to provide an image reading device capable of preventing liquid entering the accommodating space from reaching an electrical part via the flat cable and, thus, preventing malfunction of the electrical part.

According to an aspect of the disclosure, an image reading device includes a housing, a first support member, a reading unit, a movable member, and a flat cable. The housing includes a bottom surface and a frame member that faces the bottom surface with a predetermined spacing therebetween. The housing defines an accommodating space between the bottom surface and the frame member. The first support member is supported by the housing with an outer periphery of the first support member surrounded by the frame member. The first support member covers the accommodating space. The first support member is configured to support a document. The reading unit is disposed in the accommodating space and extends in a first direction parallel to the first support member. The reading unit is configured to read an image on the document supported by the first support member. The movable member holds the reading unit and is configured to reciprocally move in a second direction perpendicular to the first direction. The flat cable has one end connected to the reading unit, a middle portion disposed on the bottom surface, and the other end connected to an electrical part disposed outside the accommodating space. The flat cable is configured to follow reciprocating movement of the movable member. The housing further includes a cable receiving portion formed in the bottom surface and receiving the middle portion of the flat cable thereon, and a support wall protruding from the bottom surface toward the first support member, extending along the cable receiving portion in the second direction, and supporting a location proximate to a portion of the outer periphery of the first support member. The cable receiving portion is formed at a higher height level than a particular area of the bottom surface located between the support wall and the cable receiving portion.

With this formation of the cable receiving portion, even when liquid that has entered the accommodating space through a gap between the outer periphery of the first platen glass and the support wall falls down along the support wall, the liquid stays in the particular area of the bottom wall surface located at a lower height level than the cable receiving portion. Accordingly, in the image reading device, the liquid that has entered is less likely to reach the middle portion of the flat cable disposed in the cable receiving portion. Thus, the liquid is prevented from moving along the flat cable.

Thus, the image reading device can reduce the possibility that the liquid that has entered the accommodating space reaches the electrical part along the flat cable, and thus prevent malfunction of the electrical part.

According to another aspect of the disclosure, an image reading device includes a housing, a first support member, a reading unit, a movable member, and a flat cable. The housing includes a bottom surface and a frame member that faces the bottom surface with a predetermined spacing therebetween. The housing defines an accommodating space between the bottom surface and the frame member. The first support member is supported by the housing with an outer periphery of the first support member surrounded by the frame member. The first support member covers the accommodating space. The first support member is configured to support a document. The reading unit is disposed in the accommodating space and extends in a first direction parallel to the first support member. The reading unit is configured to read an image on the document supported by the first support member. The movable member holds the reading unit. The movable member is configured to reciprocally move in a second direction perpendicular to the first direction. The flat cable has one end connected to the reading unit, a middle portion disposed on the bottom surface, and the other end connected to an electrical part disposed outside the accommodating space. The flat cable is configured to follow reciprocating movement of the movable member. The housing further includes a cable receiving portion formed in the bottom surface and receiving the middle portion of the flat cable thereon, and a support wall protruding from the bottom surface toward the first support member, extending along the cable receiving portion in the second direction, and supporting a location proximate to a portion of the outer periphery of the first support member. The bottom surface includes a particular area that surrounds the cable receiving portion. The particular area of the bottom surface is formed at a lower height level than the cable receiving portion.

With this configuration, the image reading device can reduce the possibility that a liquid that has entered the accommodating space reaches the electrical part along the flat cable, and thus prevent malfunction of the electrical part.

DESCRIPTION OF THE DRAWINGS

FIG. 9A is a partial top view of the scanner base of the image reading device according to the exemplary embodiment; and FIG. 9B is a partial cross-sectional view taken along a line A-A of FIG. 9A.

DETAILED DESCRIPTION

An exemplary embodiment of the disclosure is described below with reference to the accompanying drawings.

Figure 1:
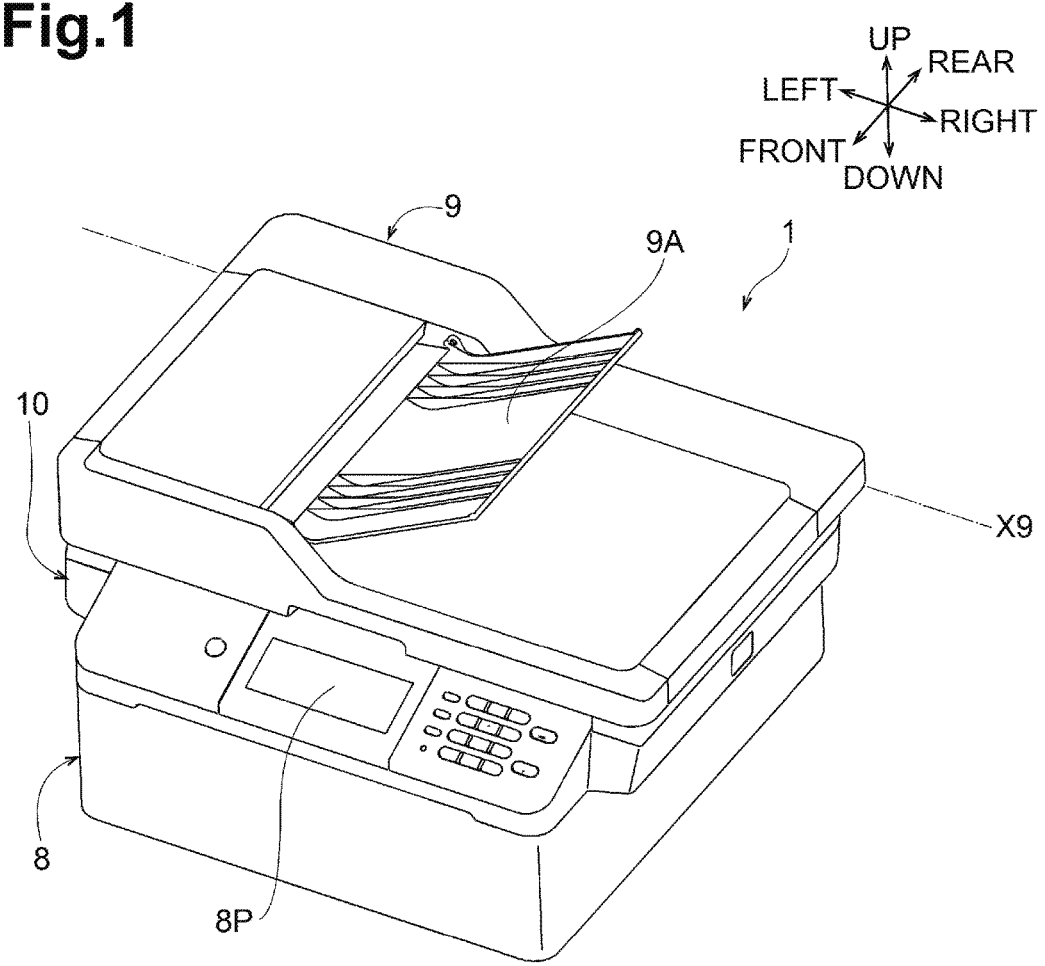
FIG. 1 is a perspective view of an image reading device according to an exemplary embodiment.

As illustrated in FIG. 1, an image reading device 1 according to an exemplary embodiment is a particular example of an image reading device according to the disclosure. In FIG. 1, a side on which an operation panel 8P is provided is defined as a "front side" of the image reading device, and a side on the left when the operation panel 8P is viewed from the front is defined as a "left side" of the image reading device. Thus, the front, rear, right, and left directions are illustrated in FIG. 1. In addition, directions illustrated in FIG. 2 and the subsequent drawings are defined as in FIG. 1. The constituent elements of the image reading device 1 are described below with reference to FIG. 1 and the other drawings.

Configuration

As illustrated in FIGS. 1 to 5, the image reading device 1 includes a main body 8, a cover 9, an image forming unit 5, an image reading unit 3, and a conveyance unit 4. The main body 8 has a substantially flat box shape. As illustrated in FIG. 1, the operation panel 8P, such as a touch panel, is attached to the front surface of the main body 8.

Figure 2:
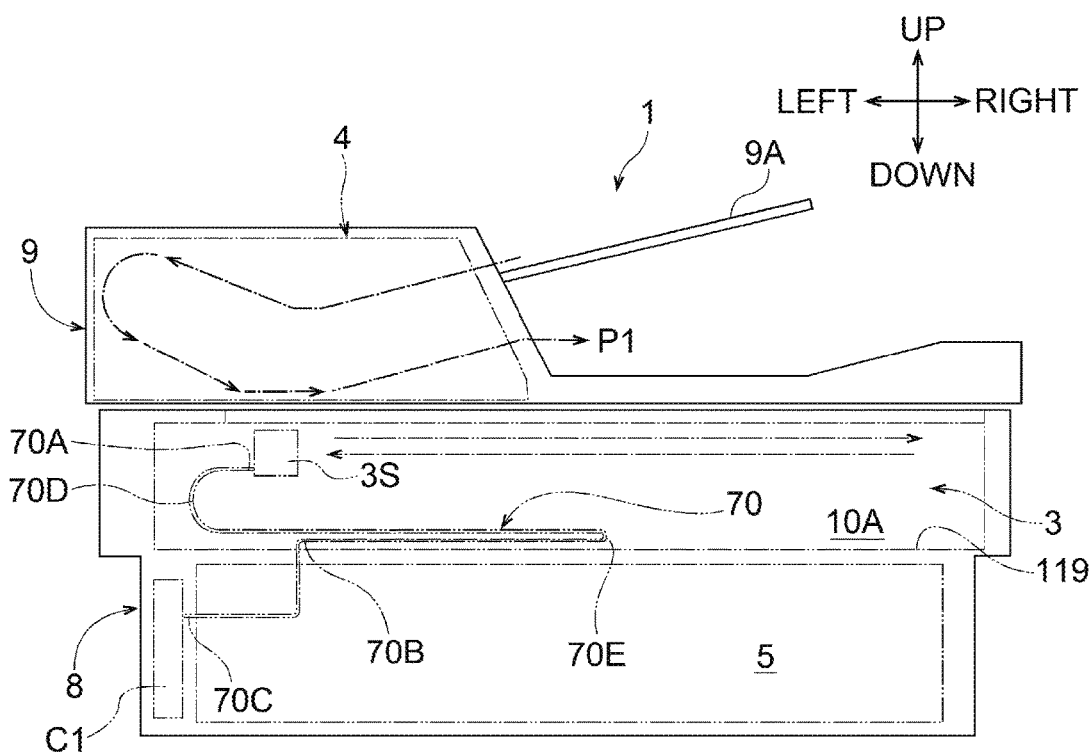
FIG. 2 is a schematic front view of the image reading device according to the exemplary embodiment.
Figure 3:
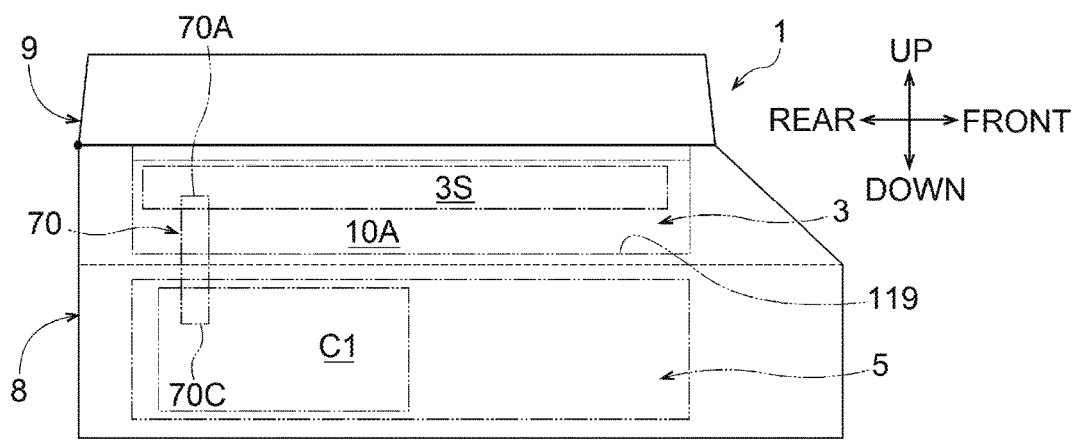
FIG. 3 is a schematic side view of the image reading device according to the exemplary embodiment.

In addition, as illustrated in FIGS. 2 and 3, the image reading device 1 further includes a control board C1. The control board C1 is an example of an "electrical part". The control board C1 is mounted inside the main body 8 so as to extend along the left side surface in the vertical direction. In addition, the control board C1 is disposed beneath the bottom wall surface 119 of a scanner base 110 (described in more detail below). The control board C1 controls the image forming unit 5, the image reading unit 3, the conveyance unit 4, and the operation panel 8P.

As illustrated in FIG. 2, the image forming unit 5 is disposed in a lower section of the main body 8. The image forming unit 5 forms an image on a sheet using, for example, an inkjet printing technique or a laser printing technique. The image reading unit 3 is disposed in an upper section of the main body 8. The image reading unit 3 is used to read an image on a document. The conveyance unit 4 is provided in the cover 9. The conveyance unit 4 sequentially conveys a plurality of sheets along a conveyance path P1 illustrated in FIG. 2 and FIG. 5 and allows the image reading unit 3 to read the image on the sheet.

Figure 4:
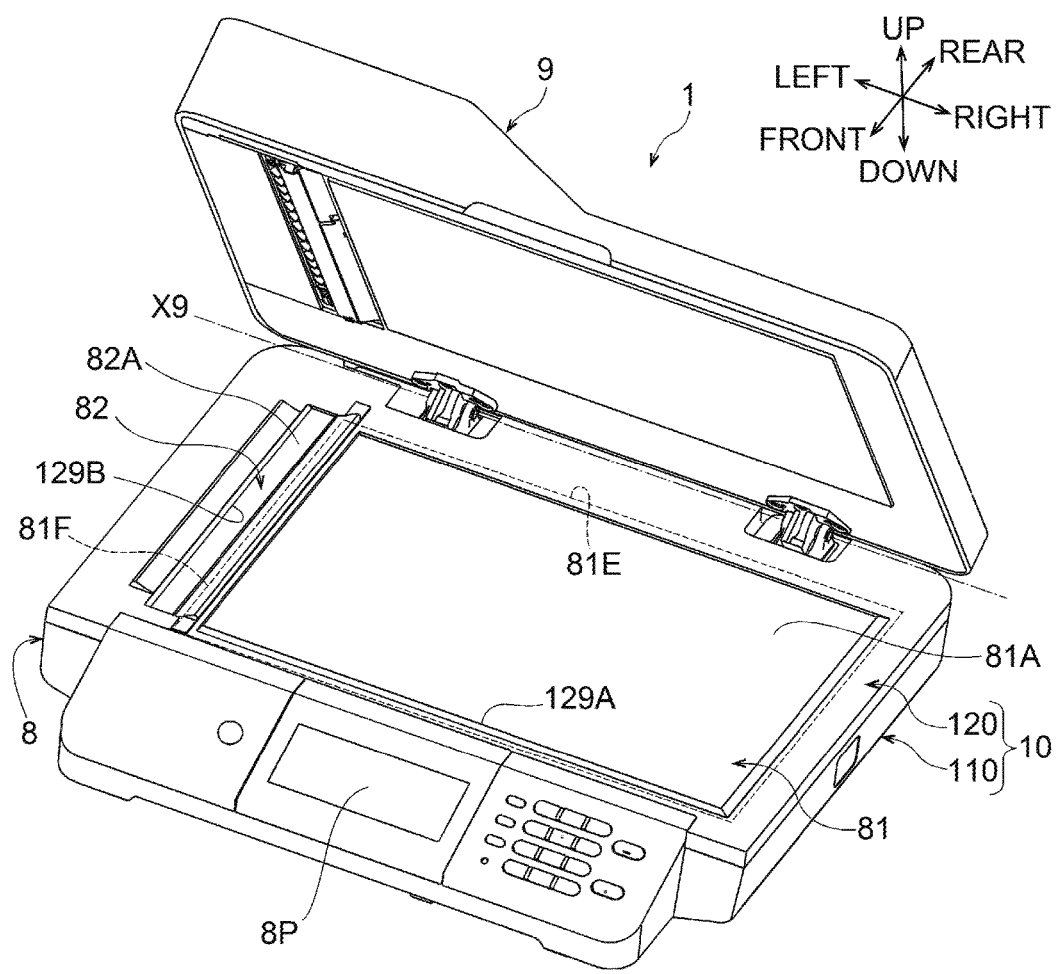
FIG. 4 is a partial perspective view of the image reading device with a support surface open according to the exemplary embodiment.
Figure 5:
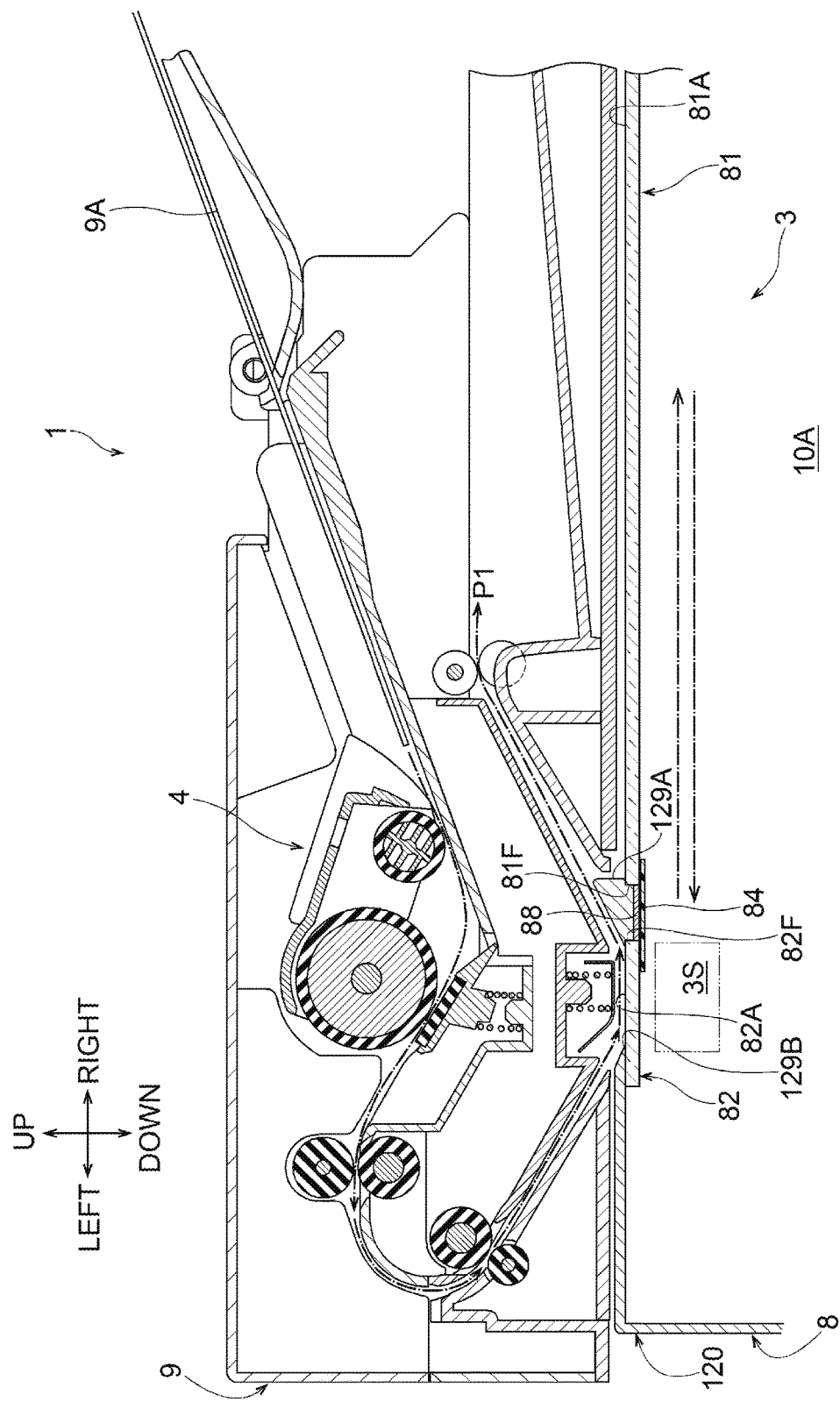
FIG. 5 is a partial cross-sectional view of the image reading device according to the exemplary embodiment.
Figure 6:
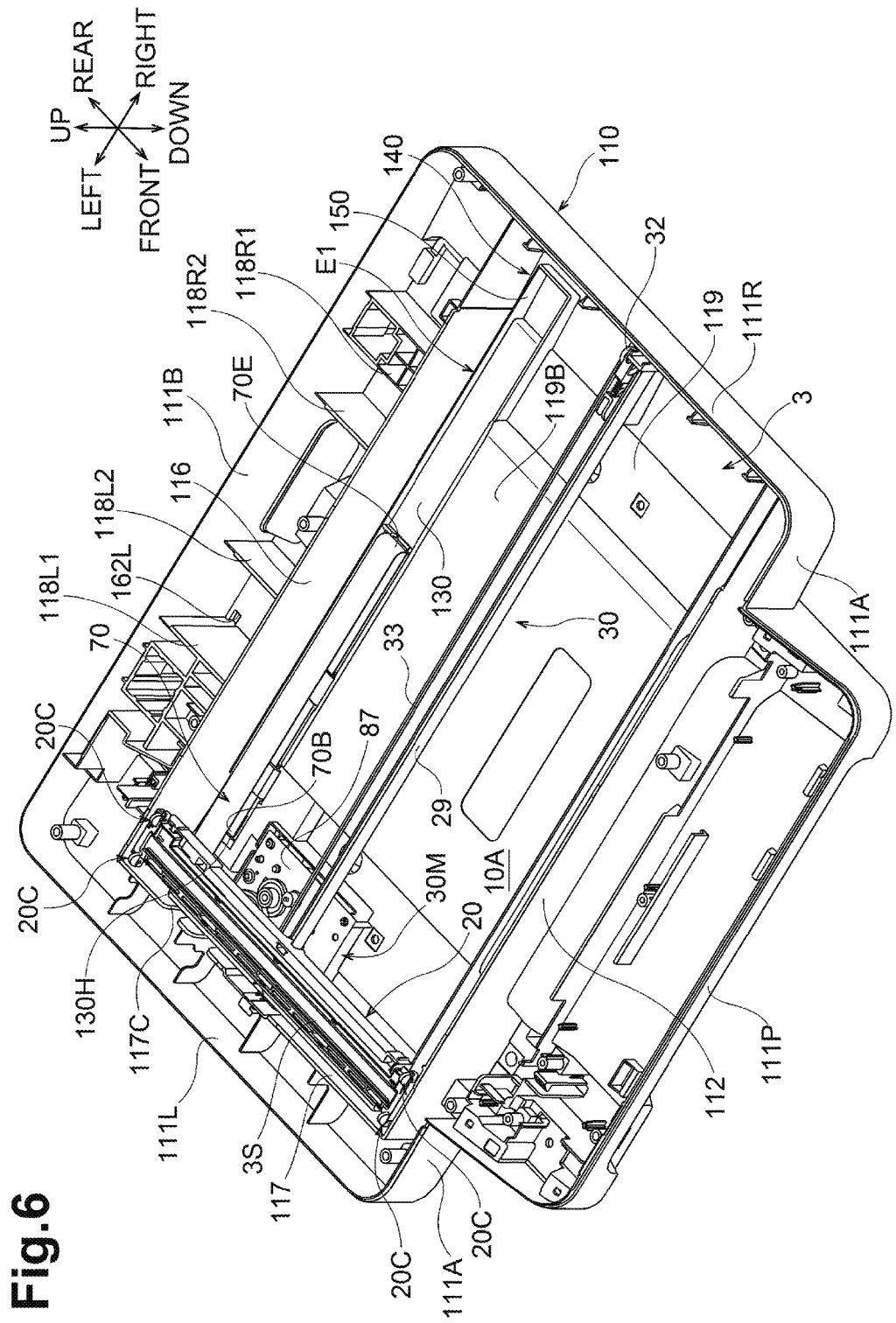
FIG. 6 is a partial perspective view of a scanner base, a reading unit, a movable member, and a scanning mechanism of the image reading device according to the exemplary embodiment.

As illustrated in FIGS. 4 to 6, the image reading unit 3 includes a scanner housing 10, first platen glass 81, second platen glass 82, a carriage 20, a read sensor 3S, a scanning mechanism 30, and a flat cable 70. The scanner housing 10 is an example of a "housing". The first platen glass 81 is an example of a "first support member". The second platen glass 82 is an example of a "second support member". The carriage 20 is an example of a "movable member". The read sensor 3S is an example of a "reading unit".

As illustrated in FIG. 4, the scanner housing 10 includes the scanner base 110 and a scanner top 120, which are combined in the vertical direction. The scanner top 120 is an example of a "frame member". According to the present exemplary embodiment, each of the scanner base 110 and the scanner top 120 is formed as an injection-molded thermoplastic resin product. As illustrated in FIG. 4, a front portion of the scanner base 110 illustrated in FIG. 6 is covered by the operation panel 8P from above.

As illustrated in FIGS. 6 to 11, the scanner base 110 has the bottom wall surface 119, a left wall 111L, a right wall 111R, a front wall 111A, and a rear wall 111B formed therein. The bottom wall surface 119 has a plurality of stepped portions and convex and concave portions, but generally looks like a substantially rectangular plane that extends in a substantially horizontal direction. The bottom wall surface 119 is an example of a "bottom surface of a housing". The right wall 111R and the left wall 111L protrude upward from the right and left edges of the bottom wall surface 119, respectively. The front wall 111A and the rear wall 111B protrude upward from the front and rear edges of the bottom wall surface 119, respectively. As illustrated in FIG. 6, an operation panel support 111P is formed in the middle of the front wall 111A in the right-left direction so as to bulge forward. The operation panel support 111P supports the operation panel 8P from underneath.

Figure 7:
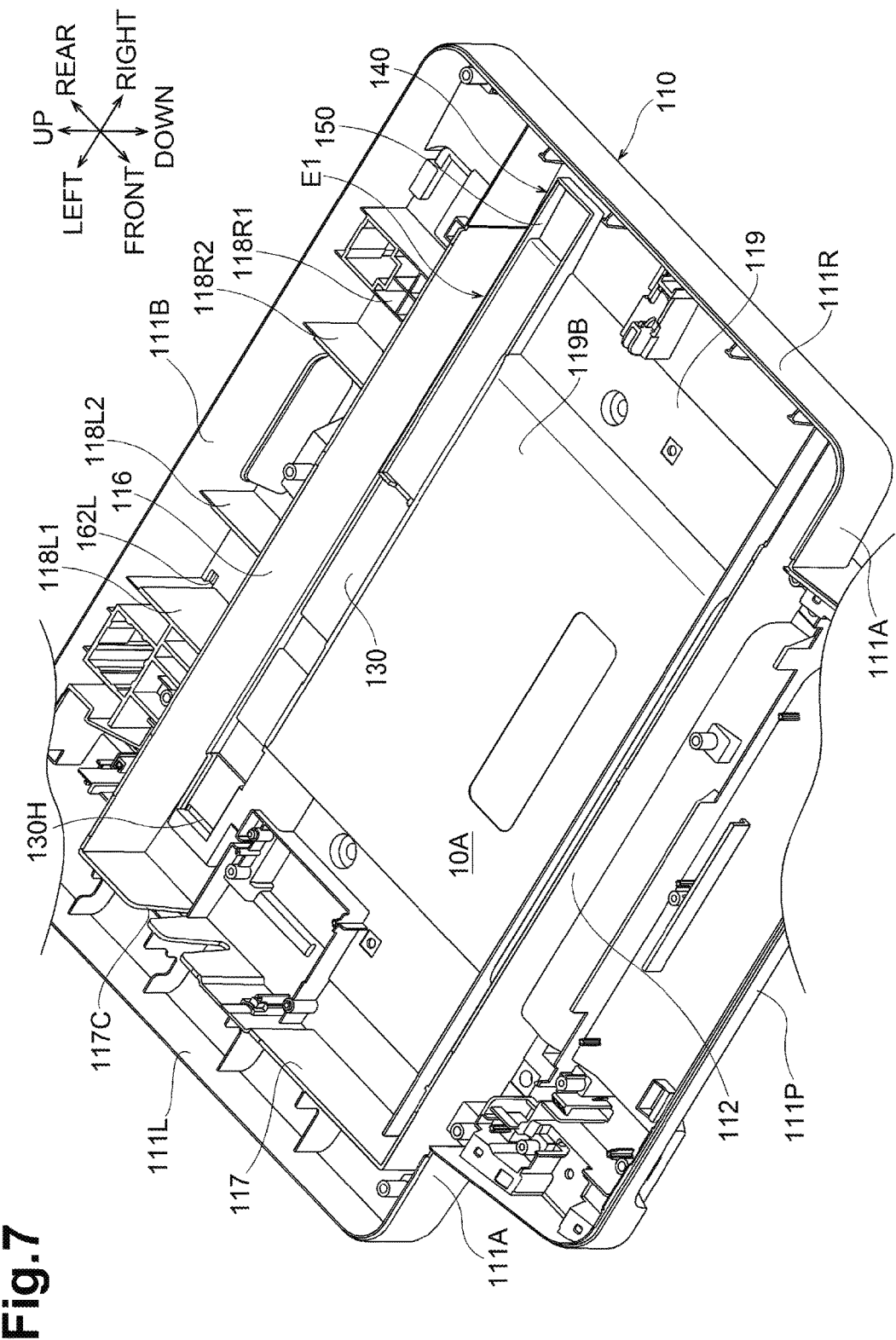
FIG. 7 is a partial perspective view of the scanner base of the image reading device according to the exemplary embodiment.

As illustrated in FIGS. 6 and 7, the scanner base 110 has a support wall 112 formed therein. The support wall 112 is located on the rear side of the front wall 111A, protrudes upward from the bottom wall surface 119, and extends substantially parallel to the front wall 111A in the right-left direction.

As illustrated in FIGS. 6 to 11, the scanner base 110 further has a support wall 116 and a partition wall 117 formed therein. The support wall 116 is located in front of the rear wall 111B and protrudes upward from the bottom wall surface 119. In addition, the support wall 116 extends substantially parallel to the rear wall 111B in the right-left direction. The partition wall 117 is located to the right of the left wall 111L and protrudes upward from the bottom wall surface 119. In addition, the partition wall 117 extends substantially parallel to the left wall 111L in the front-rear direction. As illustrated in FIGS. 7 to 8 and FIGS. 9A and 9B, the left end of the support wall 116 is connected to the rear end of the partition wall 117.

As illustrated in FIGS. 4 and 5, the scanner top 120 is a frame-shaped member having a first opening 129A and a second opening 129B formed therein. The first opening 129A has a large rectangular shape. The second opening 129B is located to the left of the first opening 129A and has an elongated rectangular shape extending in the front-rear direction. The first platen glass 81 is located in the first opening 129A of the scanner top 120. In contrast, the second platen glass 82 is located in the second opening 129B of the scanner top 120.

Figure 10:
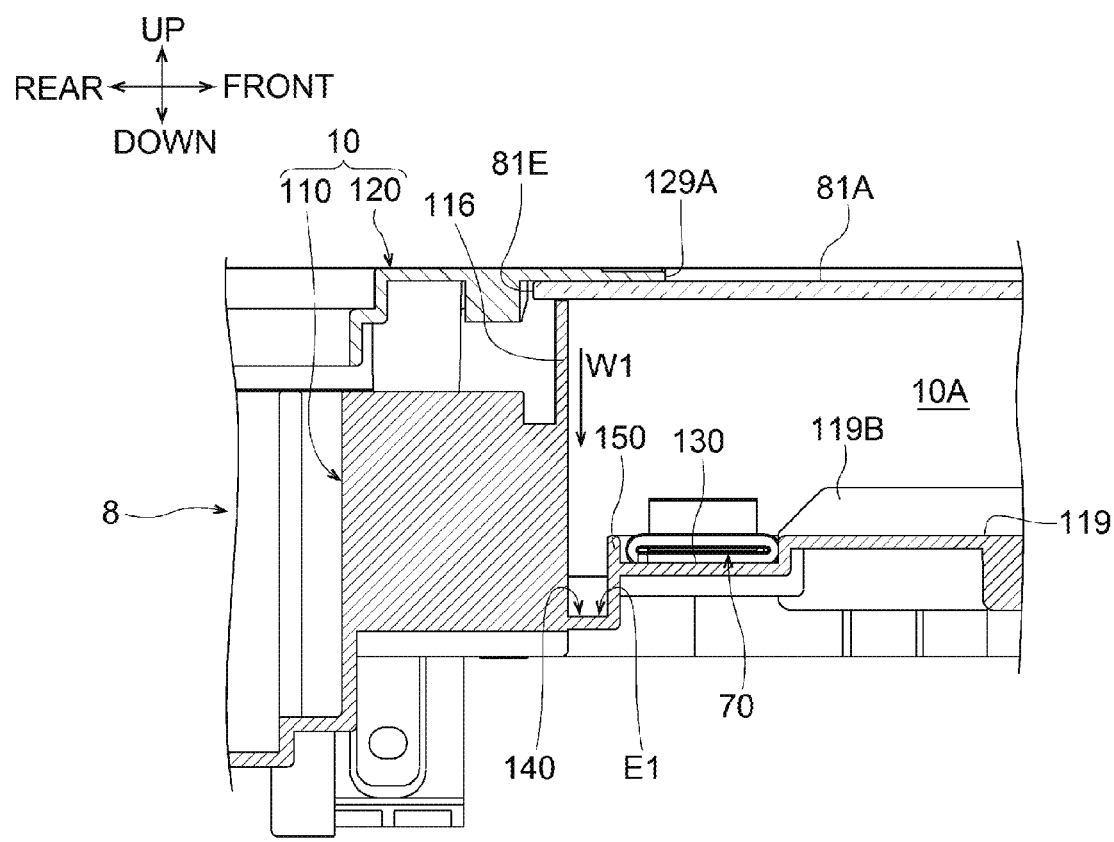
FIG. 10 is a partial cross-sectional view taken along a line B-B of FIG. 9A.
Figure 11:
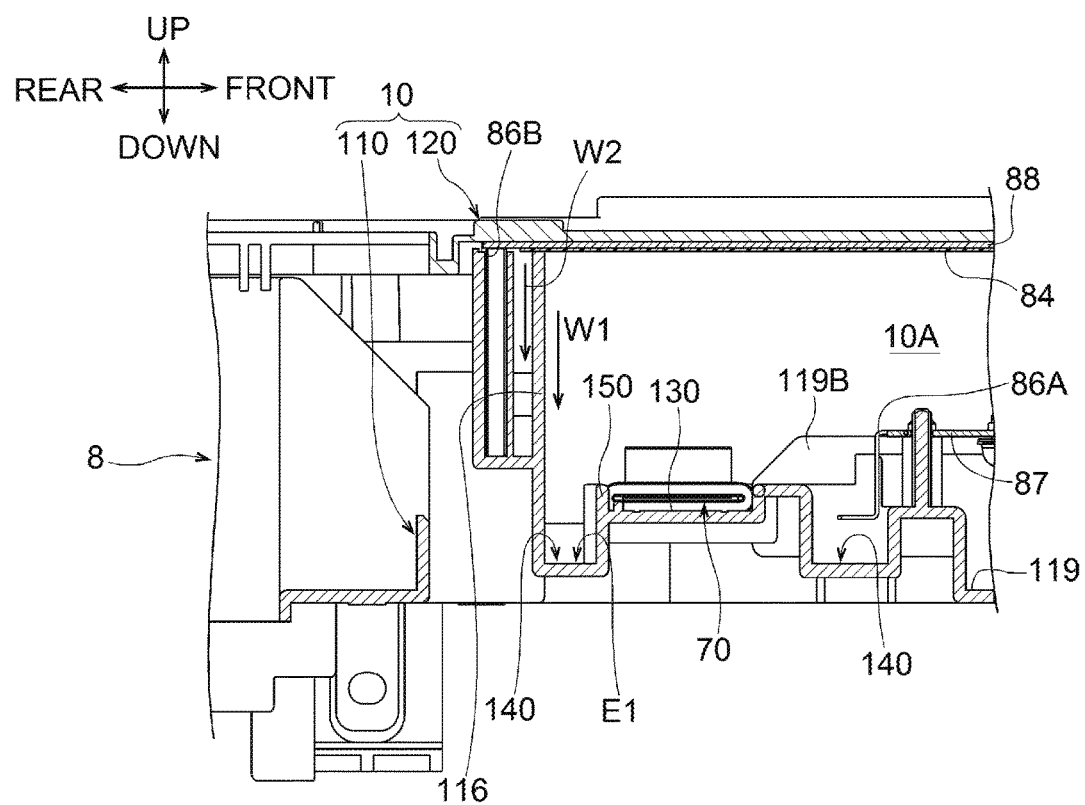
FIG. 11 is a partial cross-sectional view taken along a line C-C of FIG. 9A.

As illustrated in FIGS. 10 and 11, the scanner top 120 faces the bottom wall surface 119 of the scanner base 110 from above with a predetermined spacing therebetween. As illustrated in FIGS. 5 to 11, the scanner housing 10 has an accommodating space 10A defined between the bottom wall surface 119 of the scanner base 110 and the scanner top 120. As illustrated in FIG. 4, the first platen glass 81 is supported by the scanner housing 10 so as to cover the accommodating space 10A with an outer periphery 81E surrounded by the rim of the first opening 129A of the scanner top 120.

Although not illustrated, the entire outer periphery 81E of the first platen glass 81 illustrated in FIG. 4 is bonded to the scanner top 120 using a double-sided adhesive tape (not illustrated). In addition, the first platen glass 81 is pinched by the scanner top 120 and the scanner base 110 which are assembled with each other. More specifically, the front edge of the outer periphery 81E of the first platen glass 81 (illustrated in FIG. 4) is pinched by the support wall 112 of the scanner base 110 and a front end portion of the scanner top 120. In addition, the right edge of the outer periphery 81E of the first platen glass 81 is pinched by the right wall 111R of the scanner base 110 and a right end portion of the scanner top 120. As illustrated in FIG. 10, the rear edge of the outer periphery 81E of the first platen glass 81 is pinched by the support wall 116 of the scanner base 110 and a rear portion of the scanner top 120.

As illustrated in FIG. 5, an elongated portion of the scanner top 120 that extends in the front-rear direction between the first opening 129A and the second opening 129B has a plate-like metallic member 88 attached thereto from underneath in order to reinforce the portion. In addition, a left edge 81F of the outer periphery 81E of the first platen glass 81 (refer to FIGS. 4 and 5) is bonded to the metallic member 88 using an adhesive tape 84 illustrated in FIG. 5. That is, the left edge 81F of the first platen glass 81 is not pinched by the scanner top 120 and the scanner base 110. As illustrated in FIG. 5, a right edge 82F of the second platen glass 82 is bonded to the metallic member 88 using the adhesive tape 84.

As illustrated in FIG. 11, the metallic member 88 and the adhesive tape 84 extend to the rear such that the rear ends of the metallic member 88 and the adhesive tape 84 are disposed at positions beyond the support wall 116 of the scanner base 110. Although not illustrated, the metallic member 88 and the adhesive tape 84 extend to the front such that the front ends of the metallic member 88 and the adhesive tape 84 are disposed at positions beyond the support wall 112 of the scanner base 110.

In this manner, as illustrated in FIG. 10, the first platen glass 81 is supported by the scanner housing 10 with a predetermined spacing between the first platen glass 81 and the bottom wall surface 119 of the scanner base 110. In addition, as illustrated in FIG. 5, the second platen glass 82 is supported by the scanner housing 10 with a predetermined spacing between the second platen glass 82 and the first platen glass 81 in the right-left direction.

As illustrated in FIGS. 4 and 5, the upper surface of the first platen glass 81 constitutes a support surface 81A. When the image reading unit 3 reads the image of a stationary document, the support surface 81A supports the document from underneath. Examples of the document to be read include a sheet, such as a paper sheet or a transparency, and a book.

The upper surface of the second platen glass 82 constitutes a reading surface 82A. When the image reading unit 3 reads the images of sheets that are conveyed one by one by the conveyance unit 4, the reading surface 82A is in contact with the sheet from underneath and guides the sheet.

As used herein, an object having an image to be read using the support surface 81A is referred to as a "document", and an object having an image to be read while being conveyed by the conveyance unit 4 is referred to as a "sheet". The "document" and "sheet" may be substantially the same.

As illustrated in FIG. 1, the cover 9 is supported by a hinge (not illustrated) disposed on the rear upper edge of the main body 8 in a pivotable manner about an axis X9 that extends in the right-left direction. If, as illustrated in FIGS. 1 to 3 and FIG. 5, the cover 9 is closed, the cover 9 covers the document support surface 81A from above. As illustrated in FIG. 4, if the cover 9 pivots about the axis X9 so that the front end is displaced upward and rearward, the cover 9 is located in an open position at which the document support surface 81A is exposed to the outside. In this manner, a user can cause the support surface 81A to support a document to be read.

As illustrated in FIGS. 1, 2, and 5, a supply tray 9A is disposed in an upper portion of the cover 9. As illustrated in FIG. 5, as in existing structures, the conveyance unit 4 includes, for example, a conveyance roller and a separation roller. The conveyance unit 4 separates a plurality of sheets supported by the supply tray 9A one by one and sequentially conveys the separated sheets along the conveyance path P1.

As illustrated in FIG. 6, the carriage 20, the read sensor 3S, the scanning mechanism 30, and the flat cable 70 are accommodated in the accommodating space 10A. A guide shaft 29 is disposed on the bottom wall surface 119 of the scanner base 110. The guide shaft 29 is located in substantially the middle of the bottom wall surface 119 in the front-rear direction and extends from the partition wall 117 of the scanner base 110 to the right wall 111R in the right-left direction.

The carriage 20 is a plastic member elongated in the front-rear direction. The carriage 20 extends from the support wall 112 to the support wall 116 of the scanner base 110 in the front-rear direction. The carriage 20 is in contact with the guide shaft 29 from above. The carriage 20 is guided by the guide shaft 29 in the right-left direction. Two rollers 20C are disposed in each of the front end and rear end of the carriage 20. The rollers 20C are in rotatable contact with the lower surface of the first platen glass 81 and the lower surface of the second platen glass 82.

The scanning mechanism 30 includes a drive unit 30M, a driven pulley 32, and a timing belt 33.

The drive unit 30M is disposed so as to be adjacent to the partition wall 117. In addition, the drive unit 30M is disposed in the vicinity of the left end of the guide shaft 29. The drive unit 30M includes an electrical motor, a plurality of gear trains each meshing with the electrical motor, and a drive pulley (neither is illustrated). As illustrated in FIG. 6, the drive unit 30M further includes a metal bracket 87. The metal bracket 87 supports the electrical motor and the gear trains. In addition, the metal bracket 87 serves as a ground part that connects, for example, the electrical motor to the ground.

As illustrated in FIG. 6, the driven pulley 32 is disposed so as to be adjacent to the right wall 111R of the scanner base 110. In addition, the driven pulley 32 is disposed on the rear side of the right end of the guide shaft 29. The timing belt 33 is an endless belt looped over the drive pulley (not illustrated) of the drive unit 30M and the driven pulley 32. Although not illustrated, a particular portion of the timing belt 33 that extends along the guide shaft 29 in the right-left direction is connected to the carriage 20.

If the drive unit 30M operates, the timing belt 33 circulates between the drive pulley (not illustrated) and the driven pulley 32. At that time, the carriage 20 can reciprocally move in the accommodating space 10A in the right-left direction by the forward rotation and the backward rotation of the electrical motor.

As illustrated in FIGS. 5 and 6, the read sensor 3S is supported by the carriage 20 in the accommodating space 10A so as to be capable of facing the first platen glass 81 and the second platen glass 82 from underneath. The read sensor 3S is an image sensor, such as a contact image sensor (CIS) or a charge coupled device (CCD). The read sensor 3S extends in the front-rear direction. The read sensor 3S has a length that is slightly greater than the width of a document placed on the support surface 81A in the front-rear direction. The front-rear direction in which the read sensor 3S extends is an example of a "first direction".

As illustrated in FIGS. 5 and 6, upon receiving a drive force from the drive unit 30M of the scanning mechanism 30, the carriage 20 reciprocally moves between the bottom wall surface 119 of the scanner base 110 and the first platen glass 81 in the right-left direction, with the rollers 20C being in contact with the lower surface of the first platen glass 81. At the same time, the read sensor 3S supported by the carriage 20 also reciprocally moves together with the carriage 20 in the right-left direction. The right-left direction in which the carriage 20 and the read sensor 3S reciprocally move is an example of a "second direction". The position of the read sensor 3S illustrated in FIG. 5 is a stationary reading position at which the read sensor 3S faces the second platen glass 82 from underneath.

As illustrated in FIG. 6, the flat cable 70 is formed by connecting a plurality of covered electric wires into a band shape. The flat cable 70 is flexible. As illustrated in FIGS. 2 and 3, one end portion 70A of the flat cable 70 is connected to the read sensor 3S. As illustrated in FIG. 2, the flat cable 70 extends from the end portion 70A to the left and is bent downward in a curved portion 70D. The flat cable 70 further extends from the curved portion 70D to the right. Thereafter, the flat cable 70 is bent downward and folded back in a folding-back portion 70E. As illustrated in FIGS. 2 and 6, the flat cable 70 further extends from the folding-back portion 70E to the left and reaches a middle portion 70B. The portion of the flat cable 70 from the folding-back portion 70E to the middle portion 70B is disposed on the bottom wall surface 119 of the scanner base 110. As illustrated in FIGS. 2 and 3, the flat cable 70 extends downward beyond the bottom wall surface 119 of the scanner base 110 and reaches the other end portion 70C. The other end portion 70C of the flat cable 70 is connected to the control board C1 disposed outside the accommodating space 10A. By changing the length from the end portion 70A to the curved portion 70D and the length from the curved portion 70D to the folding-back portion 70E, the flat cable 70 can follow the reciprocating movement of the carriage 20.

The configuration in which the portion of the flat cable 70 from the folding-back portion 70E to the middle portion 70B is disposed on the bottom wall surface 119 of the scanner base 110 is described in detail below.

As illustrated in FIGS. 6 to 11, a cable receiving portion 130 is formed in the bottom wall surface 119 of the scanner base 110. The cable receiving portion 130 receives the portion of the flat cable 70 from the folding-back portion 70E to the middle portion 70B.

The cable receiving portion 130 is located to the front of the support wall 116 and spaced apart from the support wall 116 by a predetermined distance. The cable receiving portion 130 extends parallel to the support wall 116 in the right-left direction. That is, the support wall 116 protrudes from the bottom wall surface 119 of the scanner base 110 toward the first platen glass 81 and extends along the cable receiving portion 130 in the right-left direction.

As illustrated in, for example, FIGS. 9A and 9B, the cable receiving portion 130 has a rectangular shape elongated in the right-left direction as viewed from above. In addition, as illustrated in, for example, FIG. 7, the cable receiving portion 130 is formed from a plurality of flat portions arranged along the right-left direction in a stepped manner and connected with each other. A right end of the cable receiving portion 130 is disposed at a location proximate to the right wall 111R, and there is a predetermined spacing between the right end of the cable receiving portion 130 and the right wall 111R. A left end of the cable receiving portion 130 is disposed at a location proximate to the partition wall 117, and there is a predetermined spacing between the left end of the cable receiving portion 130 and the partition wall 117. A through-hole 130H extending in the vertical direction is formed to the left of the left end of the cable receiving portion 130. As illustrated in FIG. 6, the flat cable 70 is bent from the middle portion 70B downward. Thereafter, the flat cable 70 passes through the through-hole 130H and is connected to the control board C1.

As illustrated in FIGS. 6 to 11, an area of the bottom wall surface 119 of the scanner base 110 located between the support wall 116 and the cable receiving portion 130 is defined as a portion of a "particular area E1". The particular area E1 extends in the right-left direction between the support wall 116 and the cable receiving portion 130. In addition, the particular area E1 extends forward between the right end of the cable receiving portion 130 and the right wall 111R. Thereafter, the particular area E1 is bent to the left. Furthermore, the particular area E1 extends forward between the left end of the cable receiving portion 130 and the partition wall 117. Thereafter, the particular area E1 is bent to the right. That is, the particular area E1 surrounds the cable receiving portion 130 in a substantially C shape.

As illustrated in, for example, FIGS. 10 and 11, the cable receiving portion 130 is formed at a higher height level than the particular area E1. That is, the particular area E1 of the bottom wall surface 119 of the scanner base 110 that surrounds the cable receiving portion 130 is formed at a lower height level than the cable receiving portion 130. Such a particular area E1 defines a groove portion 140 formed in the bottom wall surface 119 of the scanner base 110. The groove portion 140 is recessed between the cable receiving portion 130 and the support wall 116. The groove portion 140 extends in the front-rear direction and further extends so as to surround the cable receiving portion 130 in a substantially C shape.

The bottom wall surface 119 of the scanner base 110 further has a standing wall 150 formed thereon. The standing wall 150 protrudes from the boundary between the cable receiving portion 130 of the bottom wall surface 119 and the groove portion 140 toward the first platen glass 81 and extends along the boundary between the cable receiving portion 130 of the bottom wall surface 119 and the groove portion 140. Thus, the standing wall 150 surrounds the cable receiving portion 130 in a substantially C shape. Note that the bottom wall surface 119 of the scanner base 110 has a bulged portion 119B protruding therefrom. As illustrated in, for example, FIGS. 8 and 10, the bulged portion 119B is adjacent to the cable receiving portion 130 from the front and protrudes higher than the cable receiving portion 130.

Figure 8:
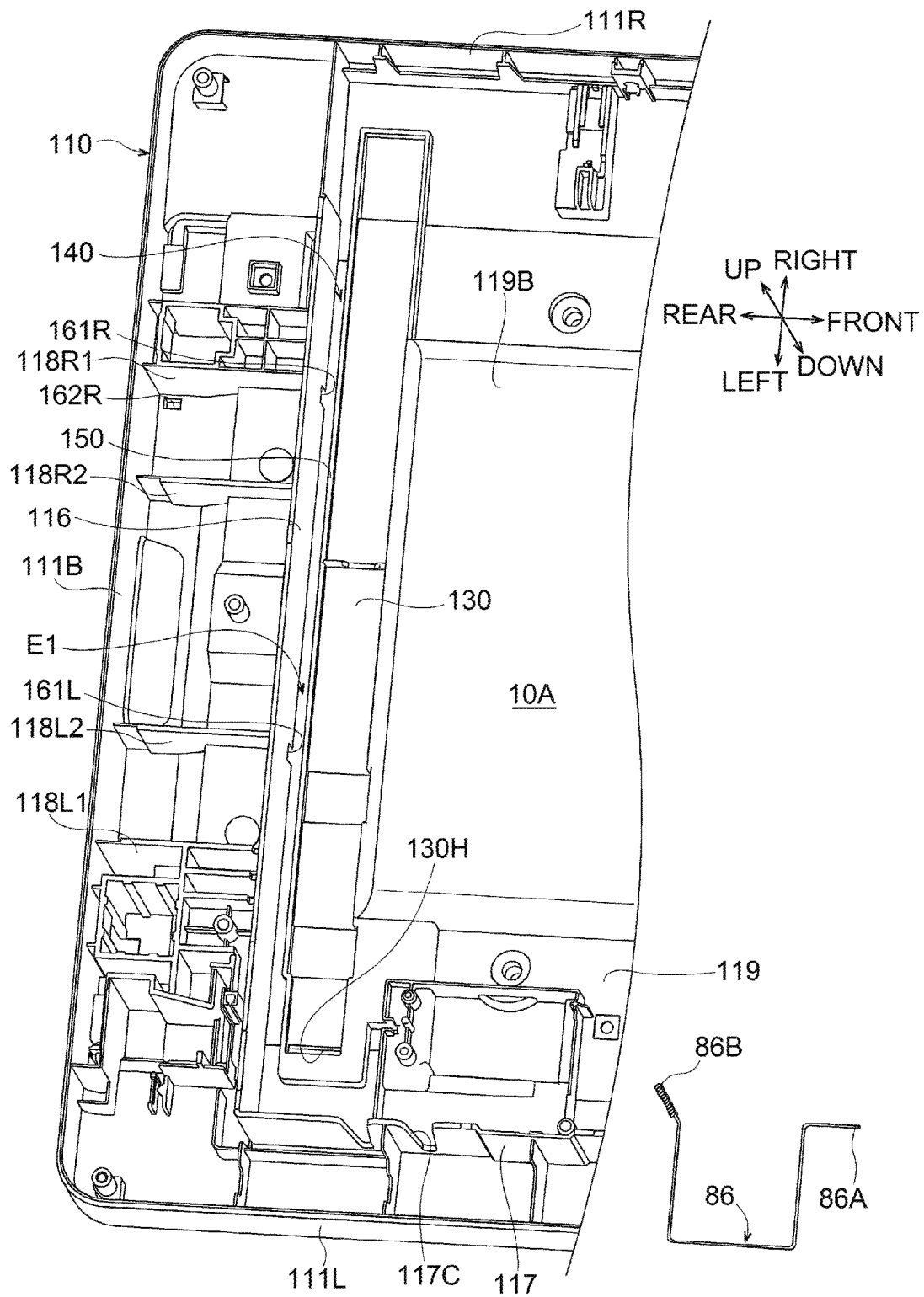
FIG. 8 is a partial perspective view of the scanner base and a ground wire of the image reading device according to the exemplary embodiment.

As illustrated in FIG. 8 and FIGS. 9A and 9B, first discharge ports 161L and 161R are formed in a lower end portion of the support wall 116 of the scanner base 110. The first discharge ports 161L and 161R are disposed in substantially a middle portion of the support wall 116 in the right-left direction with spacing therebetween and are formed through the support wall 116 in the front-rear direction to be defined by the support wall 116 and the bottom wall surface 119. Thus, the first discharge ports 161L and 161R allow the particular area E1 located in front of the support wall 116 to communicate with the outside of the accommodating space 10A (that is, a space provided behind the support wall 116).

As illustrated in FIGS. 7 to 8 and FIGS. 9A and 9B, second discharge ports 162L and 162R are formed in the bottom wall surface 119 of the scanner base 110 at positions proximate to the rear wall 111B. The second discharge ports 162L and 162R are formed through the bottom wall surface 119 of the scanner base 110 in the vertical direction at positions behind the first discharge ports 161L and 161R, that is, positions at which the second discharge ports 162L and 162R are located further from the flat cable 70 than the first discharge ports 161L and 161R, respectively.

More specifically, as illustrated in FIG. 7 and FIGS. 9A and 9B, a portion of the bottom wall surface 119 located behind the first discharge port 161L has partition walls 118L1 and 118L2 on either side of the first discharge port 161L in the right-left direction. The partition walls 118L1 and 118L2 protrude from the bottom wall surface 119 toward the first platen glass 81. The front end of each of the partition walls 118L1 and 118L2 is connected to the rear surface of the support wall 116, and the rear end of each of the partition walls 118L1 and 118L2 is connected to the front surface of the rear wall 111B. Thus, a space surrounded by the walls on the right, left, front, and rear sides is formed. The second discharge port 162L is formed so as to be adjacent to the inner surface of the partition wall 118L1 located on the left side of the space.

Similarly, as illustrated in FIG. 8 and FIGS. 9A and 9B, a portion of the bottom wall surface 119 located on the rear side of the first discharge port 161R has partition walls 118R1 and 118R2 on either side of the first discharge port 161R in the right-left direction. The partition walls 118R1 and 118R2 protrude from the bottom wall surface 119 toward the first platen glass 81. The front end of each of the partition walls 118R1 and 118R2 is connected to the rear surface of the support wall 116, and the rear end of each of the partition walls 118R1 and 118R2 is connected to the front surface of the rear wall 111B. Thus, a space surrounded by the walls on the right, left, front, and rear sides is formed. The second discharge port 162R is formed so as to be adjacent to the inner surface of the partition wall 118R1 located on the right side of the space.

As illustrated in FIG. 8, FIG. 9A, and FIG. 11, the image reading device 1 further includes a ground spring 86. The ground spring 86 is formed by bending a metal wire. One end 86A of the ground spring 86 is connected to the metal bracket 87 illustrated in FIGS. 6 and 11 in the accommodating space 10A. As illustrated in FIG. 9A, the ground spring 86 extends from the end 86A rearward and further extends to the left so as to bypass the cable receiving portion 130. Thereafter, the ground spring 86 passes through a notch 117C formed in the partition wall 117 and extends rearward along the partition wall 117. Furthermore, the ground spring 86 extends to the right along the support wall 116. Thereafter, as illustrated in FIG. 8, the ground spring 86 extends upward in a coil shape. As illustrated in FIG. 11, the other end 86B of the ground spring 86 is in contact with the rear end of the metallic member 88 from underneath. In this manner, the ground spring 86 is routed so as to bypass the support wall 116 and the cable receiving portion 130 and connects the metallic member 88 and the metal bracket 87 with each other.

Image Reading Operation

To read an image on a document supported by the support surface 81A using the read sensor 3S while moving the carriage 20, the control board C1 of the image reading device 1 controls the scanning mechanism 30 and the read sensor 3S such that the read sensor 3S mounted on the carriage 20 is moved from the left end to the right end of the image reading unit 3 inside the image reading unit 3 by the drive unit 30M. In this manner, the read sensor 3S reads the image on the document placed on the support surface 81A. The image data read by the read sensor 3S is transferred to the control board C1 via the flat cable 70. Subsequently, the scanning mechanism 30 moves back the read sensor 3S that has completed a reading operation to the original position.

In addition, to read an image on a sheet conveyed from the supply tray 9A by the conveyance unit 4, the control board C1 of the image reading device 1 controls the scanning mechanism 30 and the read sensor 3S such that the read sensor 3S mounted on the carriage 20 is moved to the left end of the image reading unit 3 inside the image reading unit 3 by the drive unit 30M, which stops the movement of the read sensor 3S at the stationary reading position. Thereafter, if the conveyance unit 4 sequentially conveys the sheet supported by the supply tray 9A along the conveyance path P1, the sheet passes through a position above the read sensor 3S located at the stationary reading position. At that time, the read sensor 3S reads the image on the sheet passing through the position. The image data read by the read sensor 3S is transferred to the control board C1 via the flat cable 70. Subsequently, the scanning mechanism 30 moves back the read sensor 3S that has completed the reading operation to the original position.

Operation and Effect

As illustrated in, for example, FIGS. 10 and 11, in the image reading device 1, the cable receiving portion 130 is formed at a higher height level than the particular area E1. That is, the particular area E1 of the bottom wall surface 119 of the scanner base 110 that surrounds the cable receiving portion 130 is formed at a lower height level than the cable receiving portion 130. Accordingly, even when liquid that has entered the accommodating space 10A through a gap between the outer periphery 81E of the first platen glass 81 and the support wall 116 falls down along the support wall 116 as indicated by an arrow W1 illustrated in FIGS. 10 and 11, the liquid stays in the particular area E1 of the bottom wall surface 119 of the scanner base 110 located at a lower height level than the cable receiving portion 130. Accordingly, in the image reading device 1, the liquid that has entered is less likely to reach the middle portion 70B of the flat cable 70 disposed in the cable receiving portion 130. Thus, the liquid is prevented from moving along the flat cable 70.

As a result, according to the image reading device 1 of the present exemplary embodiment, the liquid that has entered the accommodating space 10A can be prevented from reaching the control board C1 along the flat cable 70 and, thus, malfunction of an electrical part disposed in the control board C1 or in the vicinity of the control board C1 can be prevented.

In particular, as illustrated in, for example, FIGS. 8, 10, and 11, the groove portion 140 is formed in the particular area E1 such that the groove portion 140 is recessed between the cable receiving portion 130 and the support wall 116 and extends in the second direction. The groove portion 140 surrounds the outer periphery of the cable receiving portion 130. Such a groove portion 140 easily allows the cable receiving portion 130 to be disposed in the image reading device 1 at a higher height level than the particular area E1 of the bottom wall surface 119 of the scanner base 110. In addition, the image reading device 1 can reliably cause the liquid that has entered the inside to stay in the groove portion 140.

In addition, as illustrated in, for example, FIGS. 8, 10, and 11, the image reading device 1 has the standing wall 150 formed on the scanner housing 10. The standing wall 150 protrudes from the bottom wall surface 119 of the scanner base 110 toward the first platen glass 81 and surrounds the cable receiving portion 130. By using such a standing wall 150, the image reading device 1 can prevent liquid that has entered the inside from reaching the cable receiving portion 130. Accordingly, unlike image reading devices without the standing wall 150, the image reading device 1 can set the cable receiving portion 130 at low height level and, thus, an increase in the size of the scanner housing 10 in the vertical direction can be prevented.

In addition, as illustrated in, for example, FIGS. 9A and 9B, the scanner housing 10 of the image reading device 1 has the first discharge ports 161L and 161R formed therein. The first discharge ports 161L and 161R extend through the scanner housing 10 so as to allow the particular area E1 to communicate with the outside of the accommodating space 10A. The first discharge ports 161L and 161R are formed through the support wall 116 in the front-rear direction. The bottom wall surface 119 of the scanner base 110 has the second discharge ports 162L and 162R formed therein at positions at which the second discharge ports 162L and 162R are adjacent to the rear wall 111B, that is, at positions that are further away from the flat cable 70 than the first discharge ports 161L and 161R in the front-rear direction. Thus, the image reading device 1 can guide liquid staying in the particular area E1, through the first discharge ports 161L and 161R, to the rear of the support wall 116, that is, outside the accommodating space 10A. The liquid passes through the second discharge ports 162L and 162R and falls down along, for example, the inner surface of a rear cover of the main body 8 and is discharged from the bottom portion of the main body 8. At that time, the liquid is guided from the first discharge ports 161L and 161R to the second discharge ports 162L and 162R without widely spreading due to the presence of the partition walls 118L1, 118L2, 118R1, and 118R2. As a result, the image reading device 1 can prevent too much liquid from staying in the particular area E1 and reaching the cable receiving portion 130. Thus, malfunction of, for example, the control board C1 can be reliably prevented. Note that it is desirable that the second discharge ports 162L and 162R be formed at positions further away from the control board C1 and other electrical parts. In addition, it is desirable that a groove, for example, be formed in the main body 8 so that even when liquid discharged from the second discharge ports 162L and 162R falls down along the inner surface of the main body 8, the groove guides the liquid in a direction in which the liquid flows away from the control board C1 and the other electrical parts.

Furthermore, the image reading device 1 includes the metallic member 88 mounted on the scanner top 120, the metal bracket 87 disposed in the accommodating space 10A, and the ground spring 86 that connects the metallic member 88 to the metal bracket 87. The ground spring 86 is routed so as to bypass the support wall 116 and the cable receiving portion 130. In this manner, in the image reading device 1, the support wall 116 and the cable receiving portion 130 need not have a notch or a groove formed therein for location of the ground spring 86. Accordingly, no liquid reaches the flat cable 70 through the notch or groove.

In addition, the image reading device 1 is structured that, if a liquid spills on the left edge 81F of the first platen glass 81 and the right edge 82F of the second platen glass 82 illustrated in FIG. 5, the liquid trickles down the left edge 81F, the right edge 82F, and the adhesive tape 84 and drops at a position outside the support wall 116, that is, the position on the opposite side of the support wall 116 from the cable receiving portion 130, as indicated by an arrow W2 in FIG. 11. Accordingly, the liquid is much less likely to reach the middle portion 70B of the flat cable 70 disposed on the cable receiving portion 130.

Modification

Figure 12:
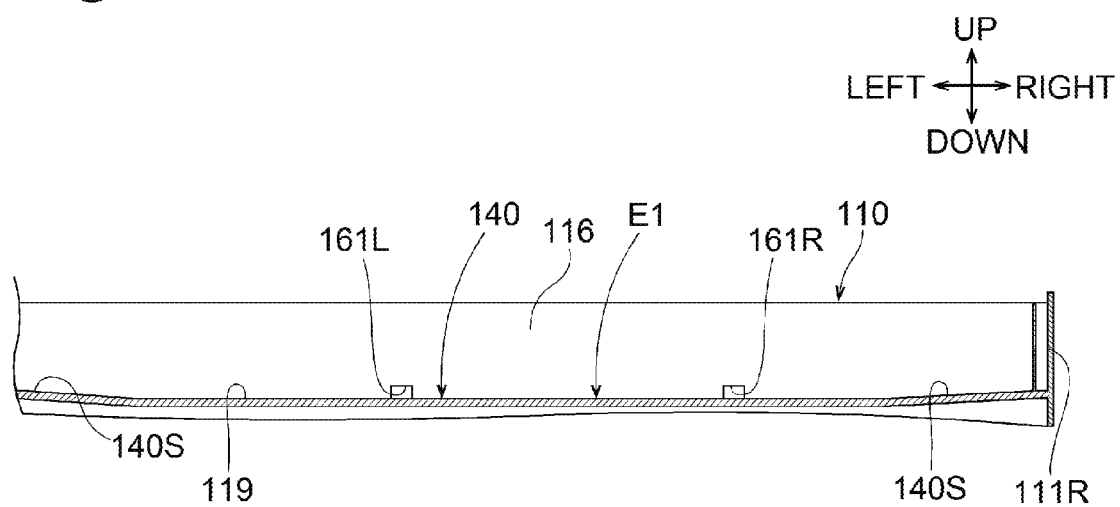
FIG. 12 is a partial cross-sectional view of an image reading device according to a modification of the exemplary embodiment, which corresponds to the partial cross-sectional view of FIG. 9B.

As illustrated in FIG. 12, in the image reading device according to a modification, slope surfaces 140S and 140S are formed as part of the bottom surface of the groove portion 140 formed by the particular area E1. The slope surfaces 140S and 140S are sloped downward toward the first discharge ports 161L and 161R, respectively. Such slope surfaces 140S and 140S can guide the liquid staying in the particular area E1 to the first discharge ports 161L and 161R.

Although the invention has been described with reference to a specific embodiment, the invention is not limited thereto. It should be understood that numerous changes may be made within the spirit and scope of the invention described.

While the exemplary embodiment has been described with reference to an electrical part serving as the control board C1, the configuration is not limited thereto. The electrical part may be, for example, a connector or an intermediate processing board, which are disposed in the accommodating space 10A.

The groove portion may be linearly formed or may be bent so as to surround two sides, three sides, or the entire periphery of the cable receiving portion.

The disclosure is applicable to, for example, image reading devices or copying machines.

What is claimed is:

1. An image reading device comprising:
    a housing including a bottom surface and a frame member that faces the bottom surface with a predetermined spacing therebetween, the housing defining an accommodating space between the bottom surface and the frame member;
    a first support member supported by the housing with an outer periphery of the first support member surrounded by the frame member, the first support member covering the accommodating space, the first support member being configured to support a document;
    a reading unit disposed in the accommodating space and extending in a first direction parallel to the first support member, the reading unit being configured to read an image on the document supported by the first support member;
    a movable member holding the reading unit, the movable member being configured to reciprocally move in a second direction perpendicular to the first direction; and
    a flat cable having one end connected to the reading unit, a middle portion disposed on the bottom surface, and the other end connected to an electrical part disposed outside the accommodating space, the flat cable being configured to follow reciprocating movement of the movable member,
    wherein the housing further includes a cable receiving portion formed in the bottom surface and receiving the middle portion of the flat cable thereon, and a support wall protruding from the bottom surface toward the first support member, extending along the cable receiving portion in the second direction, and supporting a location proximate to a portion of the outer periphery of the first support member, and
    wherein the bottom surface includes a first portion and a second portion, wherein the cable receiving portion is formed on the first portion, and wherein the first portion of the bottom surface is at a higher height level than the second portion of the bottom surface, the second portion being located between the support wall and the first portion of the bottom surface in the first direction.

2. The image reading device according to claim 1, wherein the second portion of the bottom surface defines a groove portion, the groove portion being recessed between the cable receiving portion and the support wall and extending in the second direction.

3. The image reading device according to claim 2, wherein the groove portion surrounds the cable receiving portion.

4. The image reading device according to claim 1, wherein the housing has a standing wall that protrudes from a vicinity of the cable receiving portion of the bottom surface toward the first support member and surrounds the cable receiving portion.

5. The image reading device according to claim 1, wherein the housing has a first discharge port formed therethrough such that the second portion of the bottom surface communicates with the outside of the accommodating space.

6. The image reading device according to claim 5, wherein the second portion of the bottom surface has a slope surface formed therein, and the slope surface slopes downward toward the first discharge port.

7. The image reading device according to claim 6, wherein the electrical part includes a control board disposed beneath the bottom surface, and the other end of the flat cable passes through a through-hole formed in the cable receiving portion and is connected to the control board,
    wherein the first discharge port is formed through the support wall in the first direction, and
    wherein the bottom surface has a second discharge port formed therein at a position that is further away from the flat cable than the first discharge port in the first direction.

8. The image reading device according to claim 1, further comprising:
    a metallic member mounted on the frame member;
    a ground part disposed in the accommodating space; and
    a ground spring configured to connect the metallic member to the ground part, wherein the ground spring is routed so as to bypass the support wall and the cable receiving portion.

9. The image reading device according to claim 1, further comprising:
    a cover supported by the housing such that the cover is movable between a closed position at which the cover covers the first support member and an open position at which the cover is spaced from the first support member;
    a conveyance unit provided on the cover, the conveyance unit being configured to convey document sheets one by one; and
    a second support member supported by the housing with a predetermined spacing from the first support member in the second direction, the second support member being contactable with the document sheets conveyed by the conveyance unit,
    wherein an outer edge of the first support member and an outer edge of the second support member that faces the outer edge of the first support member are bonded to the frame member using an adhesive tape, and the adhesive tape extends to a location proximate to the support wall.

10. The image reading device according to claim 9, wherein the adhesive tape extends to a position beyond the support wall in the first direction.

11. An image reading device comprising:
    a housing including a bottom surface and a frame member that faces the bottom surface with a predetermined spacing therebetween, the housing defining an accommodating space between the bottom surface and the frame member;

a first support member supported by the housing with an outer periphery of the first support member surrounded by the frame member, the first support member covering the accommodating space, the first support member being configured to support a document;

a reading unit disposed in the accommodating space and extending in a first direction parallel to the first support member, the reading unit being configured to read an image on the document supported by the first support member;

a movable member holding the reading unit, the movable member being configured to reciprocally move in a second direction perpendicular to the first direction; and a flat cable having one end connected to the reading unit, a middle portion disposed on the bottom surface, and the other end connected to an electrical part disposed outside the accommodating space, the flat cable being configured to follow reciprocating movement of the movable member, wherein the housing further includes a cable receiving portion formed in the bottom surface and receiving the middle portion of the flat cable thereon, and a support wall protruding from the bottom surface toward the first support member, extending along the cable receiving portion in the second direction, and supporting a location proximate to a portion of the outer periphery of the first support member, and wherein the bottom surface includes a first area that surrounds the cable receiving portion in the first and second directions, and a second area on which the cable receiving portion is formed, the first area of the bottom surface being formed at a lower height level than the second area of the bottom surface.

* * * * *